Figure 1:
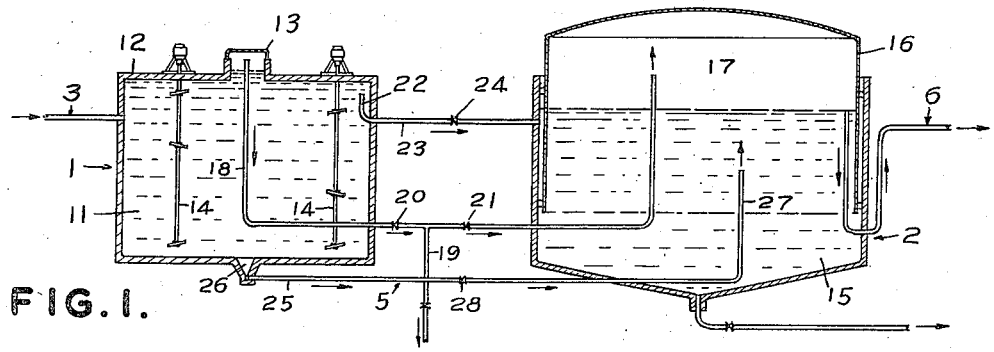

Dec. 15, 1936.  A. J. FISCHER ET AL  2,064,529

SEWAGE SLUDGE MULTIDIGESTION

Filed Jan. 28, 1935

INVENTOR
ANTHONY J. FISCHER,
NELS B. LUND,
BY
ATTORNEY.

Patented Dec. 15, 1936

2,064,529

UNITED STATES PATENT OFFICE 2,064,529

SEWAGE SLUDGE MULTIDIGESTION

Anthony J. Fischer, Jackson Heights, and Nels B. Lund, Seaford, N. Y., assignors to The Dorr Company, Inc., New York, N. Y., a corporation of Delaware Application January 28, 1935, Serial No. 3,723

8 Claims. (Cl. 210—2)

This invention relates to methods of and apparatus for the treatment of sludge derived from sewage or other polluted waste waters according to what is recognized and properly termed as anaerobic multi-digestion. Such multi-digestion employs a system or method (a) in which there is an initial or primary stage of the sludge digestion that is carried out in what may be termed an initial or primary digester or apparatus having a primary tank or basin, and—preferably (but from all aspects not essentially) and more particularly according to the opinion of the installing user—also having a gas collecting or receiving means or portion, and (b) in which there is a subsequent or secondary stage of sludge digestion that is carried out in what may be termed a subsequent or secondary digester or a secondary tank or basin that functions as a sedimentation tank or basin, and—at the option of the installing user—also having a gas collecting and receiving means or portion.

For the best and most favorable types of multi-digestion operation there must be established and maintained conditions conducive to the rapid digestion of the raw sludge as and when introduced into the system or process. This desired end is realized by the establishing and maintaining in the primary digester of a body of sludge undergoing active anaerobic bacteriological digestion. The body of actively digesting sludge thus established and maintained is at a substantially constant or approximately constant level. From time to time batches of fresh sludge to be digested are introduced into the primary digester thus supplying the organic solids that provide material which supports and maintains the digestive activity and the relatively constant consequent production of combustible gas. As the fresh sludge is introduced there is a consequent displacement and outflow from within the primary digester of an amount of digesting sludge, of which some is digested, that substantially corresponds to the amount of raw sludge introduced. This displaced digesting sludge is forthwith passed to and into the secondary digester with the result that the thus displaced sludge reaches the secondary digester in an active or digesting condition whereby the desired digestion can and will be completed in the secondary or subsequent digester.

The present invention primarily centers about the construction and arrangement of the dual outflow leading from the primary digester to the secondary digester and of the mode of operating the primary digester and of controlling the flow of displaced sludge so as to ensure active digestion conditions in the primary digester and so as to take care in an effective manner of the outflow that is required to be passed to the secondary digester. According to the present invention, the primary digester is operated under conditions—assuming the desired conditions favorable to anaerobic digestion of sludge have been established therein and continue to exist therein—that permit or periodically ensure the substantial sedimentation of actively digesting organic solids, whereby a relatively concentrated active solids layer will come into existence at or in the lower portion of the primary digester while there is allowed or caused to exist a supernatant or top liquor in which the suspended solids content is relatively low or relatively non-concentrated.

In the operation of the primary digester from one aspect, it is necessary from time to time to remove some of the digesting or active concentrated organic solids and to pass the same to the secondary digester, more particularly as otherwise expressed before the settled solids become inactive or inert, while from another aspect it is advisable to retain a relatively larger body of active or digesting organic solids, thus ensuring conditions conducive to the effecting and maintaining of rapid digestion in the primary or initial digester.

If at the time when fresh sludge is added to the primary or initial digester there is caused to be a displacement of that portion of the sludge which is low in actively digesting organic solids, there is thereby removed that liquid content which can well be disposed of and handled or treated in the subsequent digester and, consequently, room or place is made for the fresh incoming material in the primary digester, and all of this leads to rapid digestion and corresponding high digestive capacity for the primary digester, particularly in the presence of the concentrated active digesting solids content that is caused to exist in the lower portion of the initial body of sludge.

According to the present invention a two-path or split delivery for the automatic passage of sewage material from the primary or initial digester to the secondary or subsequent digester is provided, namely, along one or the lower path leading from the lower portion of the primary digester whereby by or along said lower path a portion of the sludge containing relatively concentrated digesting and digested solids is passed in the form of sludge, under controlled conditions, from the primary digester to the subsequent or secondary digester, and whereby by or along another or upper path other portions of the sludge provided by the supernatant or top liquor, which portions are in fact diluted sludge, are passed under controlled conditions from an upper interior portion of the primary digester to the subsequent or secondary digester.

The present invention according to one aspect thereof is directed to the constructing or arranging of the upper and lower conduits or pathways so that the flow therethrough or therealong, as and when such flow is allowed, is a gravity flow from the initial or primary digester to the subsequent or secondary digester and which flow takes place as a consequence of the introduction of the fresh sludge into the initial or primary digester or, in other words, incident to the displacement of said fresh sludge in the initial or primary digester. In such a case the liquid level in the secondary digester is purposely lower than that in the primary digester by an amount sufficient to overcome the head necessary to overcome the frictional resistance in the sludge lines leading from the primary to the secondary digester.

The invention according to another aspect thus involves the introduction of valves, adjustable weirs, telescoping pipes, or other suitable flow-intercepting or controlling means whereby, according to desired operation, the gravity flow through either or both of said conduits or pathways can be closed off, restricted or regulated.

The invention according to a further or more specific aspect thereof contemplates a flow through one of said conduits or along one of said pathways during certain charging periods of the raw sludge and a flow through the other of said conduits or along the other of said pathways during other charging periods of the raw sludge.

According to another specific aspect of the invention there is contemplated the adjustable regulation of the flow through the conduits or along the dual pathways leading from the primary or initial digester to the secondary or subsequent digester whereby—incident to the charging or introducing of raw sludge into the primary digester—there is a simultaneous displacement but proportioned gravity flow through both conduits or along both pathways whereby the proper and proportioned amount of sludge containing the concentrated digesting solids and the supernatant or top liquid portion, in which the digesting solids content is in a non-concentrated form, will be delivered to and into the secondary or subsequent digester.

The novel features that are considered characteristic of this invention are set forth with particularity in the appended claims. The invention itself, however, both as to its organization and its method of operation, together with additional objects and advantages thereof, will best be understood from the following description of the specific embodiments when read in connection with the accompanying drawing forming a part of this specification.

In said drawing in each figure thereof, there is illustrated a system for the anaerobic multi-digestion of sewage sludge embodying an initial or primary digester having a sewage sludge supply conduit leading thereto, a secondary or subsequent digester, and means providing dual conduits or what may be referred to as upper and lower means, the lower of which means is provided for conducting sludge containing concentrated organic solids from the lower interior portion of the primary digester to the secondary digester, and the upper of which means is provided for conducting supernatant or top liquor containing a relatively lower suspended solids content, from an upper interior portion of the primary digester to the secondary digester. In the system of each figure there is also provided means whereby clarified supernatant can be conducted from the secondary digester and also a valve-controlled conduit by which sedimented sludge that contains relatively inert organic solids can be periodically withdrawn from the secondary digester.

While each of the four figures hereinafter referred to discloses a system containing or employing the features just described, it will be noted that certain differences are embodied in each of the figures whereby different functions of the invention are realized.

In all systems there is a substantially fixed liquid level in the primary digester. This reduces explosive hazards in the fixed cover type of unit.

In Fig. 1, for example, the primary digester has a closed top providing a gas receiving or collecting space for the combustible gas produced as the result of the anaerobic digestion carried out in the primary digester. There are also illustrated in conjunction with the primary digester, agitating means which are periodically employable therein. The secondary digester has a vertically movable gas-tight top or gas holder providing at the underside thereof a receiving and storing space for the combustible gas produced. According to the construction of this Fig. 1, the gas receiving space of the primary digester is always in communication with the gas receiving space of the secondary digester.

Figure 2:
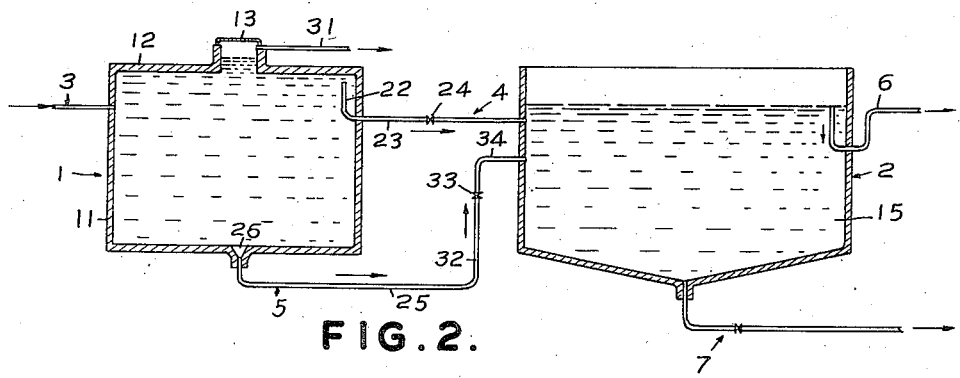

As to Fig. 2, a gas-tight top is provided for the primary digester. No gas holder or gas-tight top is provided for the secondary digester.

Figure 3:
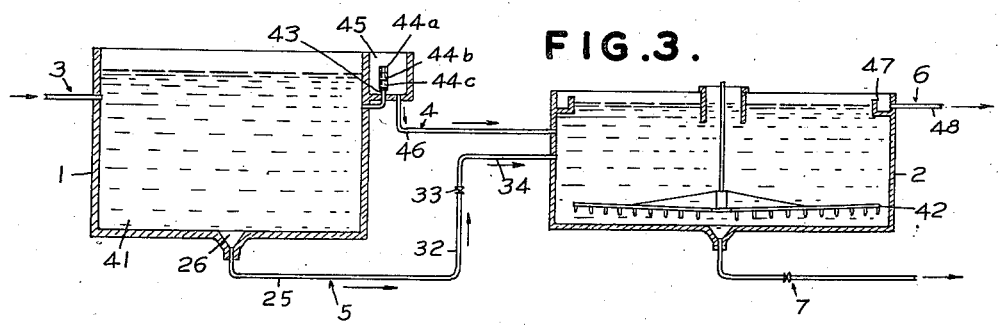

As to the arrangement of Fig. 3, open primary and secondary digesters are illustrated, in other words, digesters without any gas receiving tops employed in conjunction therewith.

Figure 4:
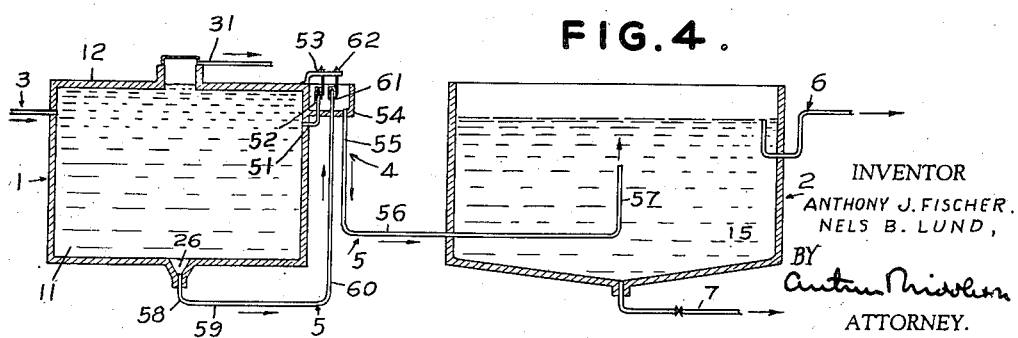

In Fig. 4 there is illustrated a system having a gas-tight top on the primary digester, but there is not illustrated any gas-tight top or holder for the secondary digester.

A different form or arrangement of dual conduits is provided for the system illustrated in each figure.

Reference is now made to the drawing in detail.

In each of the figures the initial or primary digester is broadly designated by 1, the subsequent or secondary digester by 2, the fresh sewage sludge supply conduit by 3, the dual conduits or upper and lower conducting means that lead from the primary digester to the secondary digester respectively by 4 and 5, the effluent discharge leading from the secondary digester by 6 and the valve-controlled discharge leading from the lower interior portion of the secondary digester by 7.

*System of Figure 1*

In the arrangement of Fig. 1 the initial or primary digester 1 has a primary digester tank or basin 11 with an associated gas-tight top 12 that provides at the underside thereof a gas receiving space 13. This digester is also provided with motor-operated sludge agitating means 14 which is relied upon to periodically agitate the sludge as and when desired, more particularly at a period immediately following the introduction of raw sludge into the digester through the sludge supply conduit 3.

The subsequent or secondary digester broadly designated as 2 has a subsequent or secondary tank 15 and a vertically movable gas-tight top 16 which is in the form of a vertically movable gas holder and is sometimes referred to as a gasometer.

In the normal functioning of the system a depending peripheral flange of the gas holder dips into the liquid or sludge content within the tank 15 of the secondary digester and thereby a gastight seal is maintained as between the tank 15 and the vertically movable gas holder or top 16, with the result that an expansible and contractible gas receiving and storage space 17 is provided within and at the underside of the vertically movable member or top 16. A gas pipe or conduit 18 extends between the gas receiving space 13 of the primary digester and the gas receiving space 17 of the secondary digester, with the result that a substantial equilibrium of gas pressure may be maintained within said gas receiving spaces. The gas pipe 18 has a valve-controlled branch 19 leading therefrom through which the gas can be conducted to any suitable place where it is desired to use the same and valves 20 and 21 can be provided for further closing off the passage to or from any of the receiving sections as desired or should occasion require.

As to the dual conduits leading from the interior of the primary digester to the secondary digester, it is to be noted that the upper conduit means broadly referred to by 4 includes a construction having an overflow portion 22 the entrance end of which is located at the upper interior portion of the primary digester 1. This upper conduit means 4 also has a horizontal section 23 which is controlled by a stop valve 24, thus providing a valve-controlled portion leading from the overflow inlet 22 to and terminating at the interior portion of the secondary digester tank 15. It will be manifest when the valve 24 is open that any top liquor existent in the primary digester 1, and which overflows into the portion 22, will pass to and into the body of liquid within the secondary digester.

The lower conduit broadly referred to as 5 comprises a section 25 leading from a sump portion 26 of the primary digester to and into a vertically extending section 27 terminating within the body of liquid in the secondary digester, preferably terminating in an intermediate section thereof or at least a substantial distance above the bottom or floor of the secondary digestion tank. This lower conduit 5 has a stop valve 28 for controlling or intercepting at will the flow from the primary digester through the lower conduit to and into the secondary digester.

In general in operating the arrangement of the system of this figure, the valve 24 will be closed for certain periods when the raw sewage sludge is being introduced into the primary digester with the result that a displacement of the digesting sludge will take place from the lower interior portion of the primary digester through the lower conduit 5 whereby the digesting sludge will be delivered into the secondary digester 2. This transfer will effect a transfer of sludge having a concentrated digesting organic solids content therein. In order, however, to maintain and retain a substantial content of digesting organic solids within the primary digester, whereby rapid digestion within the primary digester will be insured, it becomes desirable to close the valve 28 of the lower conduit and to open the valve 24 of the upper conduit whereby for a series of subsequent raw sludge supplies there will follow an effluent discharge through the overflow 22 past the open valve 24 to and into the secondary digester 2. This alternate opening and closing of the valves 28 and 24 can be relied upon to maintain proper operative and digesting conditions in both the primary and secondary digesters whereby essential steps of the digesting operations are effected rapidly in the primary digester and whereby a completion of the digesting operations can be effected in the secondary digester, the latter being carried out under conditions sufficiently quiescent to permit a substantial sedimentation in the secondary digester whereby the inert organic solids can be settled and ultimately be removed through the valve-controlled effluent discharge 7 while a relatively clarified effluent can pass from the secondary digester through the overflow pipe 6.

In the operating of the apparatus of this Fig. 1 there is employed a functioning of the mixing means 14 only for a short period after the introduction of the raw sludge. During a major portion of the time this mixing means is inoperative, the gasification is proceeding and there is a certain settling of digesting organic solids to within the lower regions of the primary digester whereby a settled sludge with concentrated active organic solids comes into existence while there is realized a supernatant or top liquor in which there exists some of the active digesting organic solids but not in a relatively concentrated manner. The agitation employed is also preferably sufficient to avoid the accumulation or formation of a blanket or layer of scum within the upper portion of the primary digester.

*System of Figure 2*

This system, as previously indicated, has a primary digester that has a primary digester tank 11 and a gas-tight top 12. It also has a gas receiving space 13 at the underside of the gas-tight top, but according to the arrangement of this figure the combustible gas that is received in the gas receiving space 13 is conducted therefrom through the pipe 31 to any suitable place where used or otherwise disposed of. The secondary digester has a digestion tank 15 but there is not shown in conjunction therewith any gas-tight top such as is employed in Fig. 1. In other words, the arrangement of Fig. 2 shows a system wherein the gas produced in the secondary digester will pass off into the air without being collected. No agitating means is shown in conjunction with the arrangement of Fig. 2 but it is to be understood that it is feasible to employ in the arrangement of this figure the agitating means 14 shown in Fig. 1.

As to the dual conduits leading from the primary digester to the secondary digester, the upper one broadly designated by 4 comprises the overflow intake section 22 and the horizontal section 23 that is controlled by the valve 24 and which leads to and into the secondary digester tank 15. The lower conduit broadly designated by 5 has a horizontal section 25 leading from the sump portion 26 of the primary digester to and through a section 32 having a stop valve 33 and a section 34 that terminates so as to deliver sludge passing therethrough to and into the interior of the secondary digester tank 15.

The dual conduits of this Figure function in substantially the same manner and according to the same procedure as the dual conduits illustrated in conjunction with the arrangement of Fig. 1.

System of Figure 3

Figure 3 shows a primary and a secondary digester of what may be considered the open type, the former of which is provided by a primary digester tank 41 and the latter of which is provided by a secondary digester tank 42.

According to this arrangement the lower conduit broadly designated by 5 has exactly the same arrangement of parts and functions exactly the same as the lower conduit of Fig. 2 and the parts of this conduit have been correspondingly numbered as 25, 32, and 34 and are controlled by the stop valve 33. As to the upper conduit broadly designated as 4, the construction is somewhat different in this Fig. 3 from that illustrated and described in conjunction with Figs. 1 and 2. The upper conduit 4 comprises an overflow section 43 leading from the upper interior portion of the primary digester 1 and terminating in what may be referred to as an adjustable weir construction 44, to wit, a construction such as provided by assembling annular members as 44A, 44B and 44C, one on the other, in order to effect a control of the overflow height according to desired operating conditions. The supernatant or top liquor which passes through this overflow section 43 and over the uppermost annular weir member 44A thereof overflows into a receiving box 45 from which the overflow liquor passes through the pipe or conduit 46 to and into the secondary digester tank 42. The secondary digester tank has any suitable type of effluent launder construction provided by members such as 47 from which the effluent passes through the pipe 48. The construction provided by the parts 47 and 48 may collectively be referred to as constituting the effluent discharge heretofore identified as 6.

In the secondary digester tank 42 of this figure there are illustrated mechanical rakes whereby sedimented sludge can be collected from diverse portions of the floor of the digester tank for delivery into and through the centrally disposed hopper or sump provided at the bottom portion of this digester tank 42. In fact, the construction shown in this Fig. 3 is a digester tank provided by a sedimentation tank having a Dorr type of sludge raking and discharge mechanism.

System of Figure 4

In the arrangement of Fig. 4 there is shown a closed top primary digester and an open secondary digester similar to that shown and described in conjunction with Fig. 2. The system of this figure is primarily included to illustrate a further form in which the dual conduits or upper and lower passage construction can be provided.

According to this figure it will be seen that the upper conduit broadly designated as 4 comprises an overflow section 51 having a vertically positionable discharge throat 52, positionable as for example through adjusting means indicated at 53. This discharge section which includes the members 51 and 52 conducts from the upper interior portion of the chamber liquid flowing through the same and overflowing the adjustable delivery throat 52. The overflow liquor is received in a receiving box or trough 54 and therefrom the overflow liquor passes through the pipes 55, 56, and 57 whereby it is ultimately delivered to and into the body of sludge within the secondary digester. It will therefore be seen that the parts 51, 52, 54, 55, 56, and 57 may be considered as constituting and defining the upper conduit or passageway 4. The lower passageway or conduit 5 comprises pipe portions 58, 59, and 60, the latter of which is provided with the vertically adjustable delivery throat 61 which is vertically positionable by the adjusting means 62. Sludge passing from the sump 26 through the pipe portions just referred to and overflowing the discharge throat 61 passes into the receiving box or trough 54 thence through the pipe sections 55, 56 and 57 whereby it is delivered into the body of liquid within the secondary digester. It will therefore be seen that the parts just referred to as 58, 59, 60, 61, 54, 55, 56 and 57 collectively constitute what may be referred to as the lower conduit broadly designated as 5 and this is true even though the parts 54, 55, 56 and 57 are common to both the upper conducting means 4 and the lower conducting means 5.

According to the arrangement of this figure there is enabled to be realized a proper proportioning of the gravity flow of the lower portion of the sludge containing the concentrated digesting organic solids passing from the lower interior portion of the primary digester and the supernatant or top liquid in which there do not exist concentrated digesting organic solids, with the result that there can be maintained the proper operating conditions within the primary digester and the proper proportionate discharge from the primary digester of sludge portions—having decidedly different characteristics—and all of this under conditions that permit gravity displacement-flow resulting from the introduction of fresh sewage sludge which is fed or supplied through the sludge supply conduit 3 to and into the primary digester.

In the functioning of all forms of the apparatus reliance is upon the fact that at the time of sludge transfer from the primary digester to the secondary digester the sludge existing in the lower portion of the primary digester has an active digesting solids content which is relatively concentrated as compared with conditions existing in the supernatant or upper portions of the liquid within the primary digester.

Also, according to the operation of this system there is realized a substantial sedimentation under relatively quiescent conditions of the organic solids in the secondary digester whereby there is ultimately removable from the lower portion of the secondary digester sludge containing organic solids in a relatively inert or exhausted condition.

General

It is hereby pointed out that in a multi-stage digestion system if the first digestion stage is equipped with a stirring mechanism which does not agitate sufficiently rapidly to prevent sedimentation or, in fact, if the primary digester is hopper-bottomed with no stirring and if attempts are made to displace all the sludge as bottom sludge to the secondary digester or tank, the seeding of the sludge in the primary tank will soon be depleted resulting in an acid condition and foaming. To prevent such a condition top or 'overflow liquor' may be withdrawn from the primary digester, the time of such liquor displacement in relation to the time of sludge displacement to be such that sludge solids in the primary tank shall not be depleted. For example, assuming 1,000 c. f. of raw sludge is added to or introduced into a primary digester per day and that this sludge contains 5% dry solids, and also assuming after digestion has been established and the tank is full of sludge that due to digestion the solids are reduced by 50%, and assuming that the digested sludge consolidates to 10% dry solids in the primary digester—then under this state of facts and assumptions the volume of digested sludge withdrawn per day from the primary digester should be one-fourth of the volume of raw sludge added or, in other words, 250 c. f. per day, providing the solids in the top liquor are relatively negligible. Then, under this same state of facts, 750 c. f. of top liquor or supernatant should be displaced per day. If conditions are such that the top liquor contains considerable solids, for example about 1% dry weight, then proportionately more top liquor than bottom sludge should be withdrawn to maintain proper continuous operating conditions.

Under the method of operation preferable for the realizing of the present invention, the liquid level in the primary tank should always remain at a fixed point or relatively close to a fixed point or level.

All overflow liquor from the secondary digester—which generally flows incident to a charge in the primary digester—may be further clarified or otherwise disposed of if desired. All solids removed from the primary to the secondary digester pass by gravity according to the arrangements herein shown. In other words, no pumping is required. It is not necessary to operate each day both the underflow—that portion which passes out from the primary digester through the lower conduit 5—and the top liquor outflow, that passes through the upper conduit 4, as it is permissible to allow the amount of seeding sludge in the primary tank to vary within even relatively wide limits. For best results insofar as digestion is concerned, a maximum amount of digesting sludge solids in the primary tank is preferable.

In the starting up of a digestion plant there should, of course, be no sludge withdrawn from the bottom until enough "seeding sludge" that is, sludge actively undergoing digestion, has accumulated in the primary tank to carry on digestion in a satisfactory manner. It has been demonstrated by experiment that the amount of dry solids in the "seeding sludge" in the primary tank may be as low as ten times the raw sludge solids added daily.

In an arrangement where agitation sufficiently rapid to prevent sedimentation is used in the primary digester it would take a very long time to build up a high solids concentration desirable for rapid agitation in the primary tank. Therefore, the same method of starting a system employing agitation means should be used as when a slow stirring or no mechanism is used in the primary tank, until a satisfactory sludge blanket and concentration of digesting solids has been built up. The rapid agitation mechanism need not be operated at all, or better yet, it may be operated at intervals between those during which raw sludge is pumped to the primary tank. In fact, after satisfactory digestion has been established intermittent operation of the primary agitation mechanism may be used under conditions to maintain a maximum sludge concentration in the primary tank. Under such arrangements or conditions both bottom and top sludge transfer pipes will be effectively used.

What is claimed is:

1. A method for the digestion of sewage sludge which comprises maintaining primary and secondary sludge digesting zones, selectively transferring sludge of relatively high solids content from the lower portion of said primary zone to said secondary zone, and selectively transferring supernatant sludge liquor of relatively low solids content from the upper portion of said primary zone to said secondary zone.

2. In the treatment of sewage sludge the method which comprises establishing and maintaining an initial body of sludge in an active state of digestion; establishing and maintaining a subsequent body of sludge under quiescent conditions favorable to sedimentation; from time to time feeding incoming sludge into the initial body; subjecting the initial body to intermittent agitation and thereby effecting intimate mixing of the fed sludge with the digesting sludge and allowing periods of quiescence favorable to sedimentation; selectively transferring sedimented sludge of relatively high solids content from the lower portion of said initial body to said subsequent body; and selectively transferring supernatant sludge liquor of relatively low solids content from the upper portion of said initial body to said subsequent body.

3. In the carrying out of method according to claim 1 the selective regulating of the flow from the initial body to the subsequent body so that there takes place a simultaneous, but proportioned delivery from the lower portion of the initial body of sludge containing a concentrated digesting solids content and from the upper portion of the initial body of the supernatant liquor to and into the subsequent body.

4. Apparatus for the treatment of sewage sludge comprising a primary chamber for holding a body of digesting sludge; a secondary chamber for receiving digesting sludge transferred thereto from said primary chamber and functioning as a sedimentation chamber as well as a further digesting chamber; sludge feeding means for delivering incoming sludge into said primary chamber; a set of conduit means for affording paths along which digesting sludge from the primary chamber is transferred to the secondary chamber and delivered in the liquid holding section thereof at a locality substantially above the floor of the secondary chamber, said set of conduit means having a conduit section leading from the lower portion of the primary chamber and a conduit section leading from the upper portion of the primary chamber and provided with positionable means for selectively regulating the ratio of quantity flow as between and from the lower portion of the sludge body within the primary chamber wherein the solids content is relatively high and the upper supernatant liquid portion of the sludge body within the primary chamber wherein the solids content is relatively low; an effluent means leading from the upper portion of the secondary chamber and comprising an overflow weir for determining the normal level of the body of sludge in the liquid holding section of the secondary chamber; and sludge withdrawal means leading from the lowermost section of the secondary chamber for withdrawing according to operative requirements sedimented material from within the lower portion of said secondary chamber.

5. Apparatus for the digestion of sewage sludge comprising a primary digestion chamber for holding a body of digesting sludge, a secondary digestion chamber for receiving a body of digesting sludge transferred thereto from said primary chamber and for continuing sludge digestion therein, means leading from a lower portion of the primary chamber to an intermediate portion of the secondary chamber and provided for selectively transferring sludge of relatively high solids content from the lower portion of said primary chamber to said secondary chamber, and means leading from an upper portion of the primary chamber to an upper portion of the secondary chamber and provided for selectively transferring supernatant sludge liquor of relatively low solids content from the upper portion of said primary chamber to said secondary chamber.

6. Apparatus for the digestion of sewage sludge comprising a primary digestion chamber for holding a body of digesting sludge, a secondary digestion chamber for receiving and holding a body of digesting sludge transferred thereto from said primary chamber, means for transferring sludge of relatively high solids content from the lower portion of said primary chamber to said secondary chamber, said means comprising a conduit leading from the lower portion of said primary chamber to and in communication with said secondary chamber and terminating at a location which is at an elevation substantially above that of the floor of the secondary chamber, and means for transferring supernatant sludge liquor of relatively low solids content from the upper portion of said primary chamber to said secondary chamber, said last mentioned means comprising a conduit leading from the upper portion of said primary chamber to and in communication with said secondary chamber and terminating at a location which is at an elevation at least as high above the floor of the secondary chamber as that of the terminal of the first mentioned conduit.

7. Apparatus for the digestion of sewage sludge comprising a primary digestion chamber for holding a body of digesting sludge, a secondary digestion chamber for receiving and holding a body of digesting sludge transferred thereto from said primary chamber, a conduit leading from the lower portion of said primary chamber to and in communication with said secondary chamber for transferring sludge of relatively high solids content from the lower portion of said primary chamber to said secondary chamber and for delivering the sludge transferred thereby into a section of the secondary chamber which is intermediate the upper surface and the lower defines of the body of sludge therein, an overflow receiving box associated with the upper portion of said primary chamber, means for transferring supernatant sludge liquor of relatively low solids content from the upper portion of said primary chamber to said overflow receiving box, and a conduit leading from said receiving box to and in communication with said secondary chamber for delivering the supernatant liquid transferred thereby into an upper portion of the body of liquid held within the secondary chamber, an effluent conduit leading from the upper portion of the secondary chamber and provided with an overflow weir for determining the normal level of the body of liquid held within said chamber, and means leading from the lowermost portion of said chamber for withdrawing at will sedimented material collected therein.

8. Apparatus for the digestion of sewage sludge comprising a primary digestion chamber for holding a body of digesting sludge, a secondary digestion chamber for receiving and holding a body of digesting sludge transferred thereto from said primary chamber, a receiving box associated with the upper portion of said primary chamber, an upper conduit section leading from the upper interior portion of said primary chamber and terminating in a vertically positionable overflow located within said receiving box and provided for transferring supernatant sludge liquor of relatively low solids content from the upper portion of said primary chamber to said receiving box, a lower conduit section leading from the lower interior portion of the primary chamber and terminating in a vertically positionable overflow located within said receiving box and provided for transferring sludge of relatively high solids content from the lower portion of said primary chamber to said receiving box, and a conduit section leading from said receiving box to and in communication with said secondary chamber.

ANTHONY J. FISCHER.
NELS B. LUND.